(12) United States Patent
Saito et al.

(10) Patent No.: US 11,529,775 B2
(45) Date of Patent: Dec. 20, 2022

(54) PRODUCTION METHOD FOR FIBER-REINFORCED RESIN MOLDED ARTICLE

(71) Applicant: The MOT Company, Ltd., Tokyo (JP)

(72) Inventors: Tomoaki Saito, Tokyo (JP); Yasushi Shuto, Kanagawa (JP)

(73) Assignee: THE MOT COMPANY, LTD., Tokyo (JP)

( * ) Notice: Subject to any disclaimer, the term of this patent is extended or adjusted under 35 U.S.C. 154(b) by 0 days.

(21) Appl. No.: 17/634,541

(22) PCT Filed: Feb. 28, 2020

(86) PCT No.: PCT/JP2020/008299
§ 371 (c)(1),
(2) Date: Feb. 10, 2022

(87) PCT Pub. No.: WO2020/122260
PCT Pub. Date: Jun. 18, 2020

(65) Prior Publication Data
US 2022/0266547 A1 Aug. 25, 2022

(30) Foreign Application Priority Data

Aug. 15, 2019 (JP) .............................. JP2019-149065

(51) Int. Cl.
*B29C 70/46* (2006.01)
*B29C 33/02* (2006.01)
(Continued)

(52) U.S. Cl.
CPC .............. *B29C 70/46* (2013.01); *B29C 33/02* (2013.01); *B29C 70/465* (2013.01); *B29K 2063/00* (2013.01); *B29K 2307/04* (2013.01)

(58) Field of Classification Search
CPC ..................................................... B29C 70/46
See application file for complete search history.

(56) References Cited

U.S. PATENT DOCUMENTS

2019/0002659 A1* 1/2019 Shinchi ...................... C08J 5/24

FOREIGN PATENT DOCUMENTS

| CN | 104441697 A | * | 3/2015 |
| JP | S63-154333 A | | 6/1988 |

(Continued)

OTHER PUBLICATIONS

Machine Translation of Chinese Patent 104441697, Date Unknown.*
(Continued)

*Primary Examiner* — Jeffry H Aftergut
(74) *Attorney, Agent, or Firm* — Lucas & Mercanti, LLP

(57) ABSTRACT

A method is provided in which a fiber-reinforced resin molded article having high dimensional accuracy is obtained by press molding a fiber-reinforced resin. The present invention relates to a method for producing a fiber-reinforced resin molded article by pressing a single prepreg of a fiber-reinforced resin, a plurality of stacked prepregs, or a plurality of stacked prepregs with adhesive resin sheets interposed between the prepregs, said method comprising: a step in which the prepreg is positioned between a heated upper die and a heated lower die; a step in which the upper die is lowered and a load is applied to the prepreg by the upper die and the lower die while further increasing the temperature of the upper die and the lower die; a step in which the upper die and the lower die are maintained at a temperature within a prescribed temperature range while the upper die is positioned at the bottom dead center; a step in which the heating of the upper die and the lower die is reduced or stopped; and a step in which after reducing or stopping the heating, the upper die is raised and the fiber-reinforced resin molded article is extracted.

3 Claims, 4 Drawing Sheets

(51) Int. Cl.
*B29K 63/00* (2006.01)
*B29K 307/04* (2006.01)

(56) References Cited

FOREIGN PATENT DOCUMENTS

| | | |
|---|---|---|
| JP | 2005-213352 A | 8/2005 |
| JP | 2011-216841 A | 10/2011 |
| JP | 2012-206503 A | 10/2012 |
| JP | 5682837 B2 | 3/2015 |
| JP | 2016-163989 A | 9/2016 |
| JP | 2017-001371 A | 1/2017 |
| JP | 2017-087516 A | 5/2017 |
| JP | 2017-226203 A | 12/2017 |
| WO | 2012/073775 A1 | 6/2012 |
| WO | 2018/190161 A1 | 10/2018 |

OTHER PUBLICATIONS

Pct, International Search Report for the corresponding application No. PCT/JP2020/008299, dated Apr. 14, 2020, with English translation.
JPO, Notice of Reasons for Refusal for the corresponding Japanese patent application No. 2019-149065, dated Oct. 7, 2019, with English translation.
JPO, Decision to Grant for the corresponding Japanese patent application No. 2019-149065, dated Jan. 27, 2020, with English translation.

\* cited by examiner

Fig.3
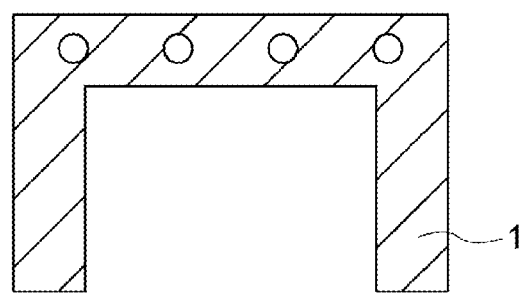
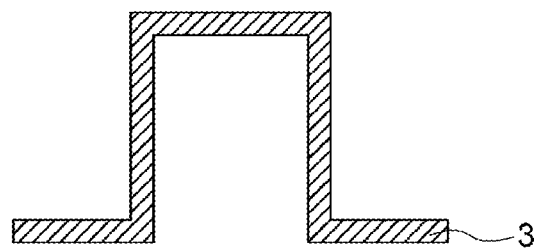
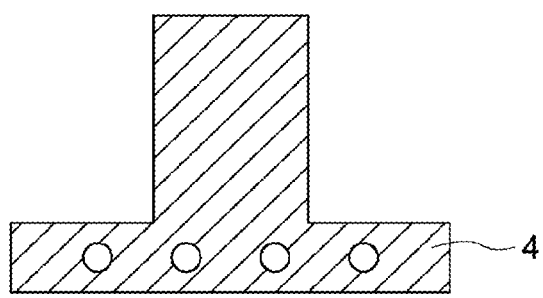

PRODUCTION METHOD FOR FIBER-REINFORCED RESIN MOLDED ARTICLE

CROSS REFERENCE TO RELATED APPLICATION

This Application is a 371 of PCT/JP2020/008299 filed on Feb. 28, 2020, which, in turn, claims priority of Japanese Patent Application No. 2019-149065 filed on Aug. 15, 2019, and the above applications are incorporated herein by reference.

TECHNICAL FIELD

The present invention relates to a method for producing a fiber-reinforced resin molded article by pressing prepregs.

BACKGROUND ART

From the viewpoint of the environmental problems, the efforts to improve the fuel consumption are made in automobile industry, aviation industry and the like. To reduce the weight of the vehicle body and the airframe, substituting the fiber-reinforced resin for the metal is hoped, and the attention to the fiber-reinforced resin is increasingly attracted.

The resin used for the fiber-reinforced resin is a thermoplastic resin or a thermosetting resin. The fiber-reinforced resin is a resin reinforced by using a fiber. The fiber-reinforced resin can be molded and shaped by heating, has high productivity, is easy to apply secondary process such as adhesion, has electric insulation, dose not corrode, and has excellent recyclability. Due to such characteristics, the fiber-reinforced resin is widely used in various fields.

Because the carbon fiber-reinforced resin having a carbon fiber as a reinforcing fiber is lightweight and has high strength and high rigidity, it has been studied and used already in a wide fields such as shipping industry, space field, wind power generation, sporting goods and the like as well as automobile industry and aviation industry aforementioned the above.

An example of the fiber-reinforced resin molded article is an article obtained by pressing, heating and curing the semi-cured prepregs obtained by impregnating reinforcing fibrous materials such as grass cloth and carbon fiber with a thermosetting resin such as epoxy, phenol, polyester mixed with the additives such as the curing agent and the adhesive and heating or drying.

Examples of the processing of the fiber-reinforced resin include the autoclave molding, the oven molding, the press molding, the RTM/VaRTM method, the pultrusion molding, the filament winding, and the sheet winding. From the viewpoints that the productivity is high and that the fiber-reinforced resin molded article having good quality is obtained, the press molding is preferable.

However, the fiber-reinforced resin has lower extensibility than metal. When the fiber-reinforced resin is molded by pressing at the same speed as the speed for the metal, the fiber-reinforced resin may break and wrinkle. In addition, there are following problems. When the heat is applied to the prepregs too much, the resin viscosity is lowered too much, and the resin is melted. As a result, no accurate molded article can be formed. But when the heat is not applied, the viscosity is not low and so the molding failure occurs.

As a method adjusting the fluidity of the resin composition of the prepreg, Patent Literature 1 discloses a resin composition for the prepreg of a mixed epoxy resin containing a solid epoxy resin of 50 to 90 parts of weight and a liquid epoxy resin of 10 to 50 parts of weight, rubber, and curing agent, wherein the rubber is blended at the amount of 5 to 60 parts of weight to the mixed epoxy resin of 100 parts of weight, and the curing agent is blended at the amount of 1 to 100 parts of weight to the mixed epoxy resin of 100 parts of weight (Patent Literature 1: JP 2005-213352 A).

Patent Literature 2 discloses a prepreg composed of the reinforcing fiber and the epoxy resin composition suitable for press molding, especially high-cycle press molding; the prepreg obtained by using the epoxy resin composition which has excellent storage stability at a room temperature, can be cured by heating at relatively low temperature in a short time, and also discloses the cured resin has high heat resistance to suppress the excessive flowage of the resin, when heated and pressed for curing (Patent Literature 2: JP 5,682,837 B).

CITATION LIST

Patent Literature

Patent Literature 1: JP 2005-213352 A
Patent Literature 2: JP 5,682,837 B

SUMMARY OF INVENTION

Technical Problem

The prepregs disclosed in Patent Literature 1 and Patent Literature 2 are prepared by specifying the component ratios of the resin composition of the prepregs to adjust the fluidity of the resin. Only when the resin compositions of the disclosed component ratios are used for the prepreg, the effects are exhibited. Namely, as for the prepregs obtained by using a resin composition except for the resin composition having component ratio described above (for example, the prepregs of the general resin compositions), the problems cannot be solved. In view of the use, the form, the size, the required cost and the like of the fiber-reinforced resin molded article used in the various fields recently, the above specific resin composition such as the resin compositions described above cannot be necessarily used, and it is difficult to apply those prepregs to all the press moldings for increased demands.

One of the objects of the present invention are is provide a method for press molding the fiber-reinforced resin without lowering the quality and the work efficiency with the high productivity.

Solution to Problem

By the earnest research, the present inventors found the method for obtaining the fiber-reinforced resin molded article having high completion by press molding the fiber-reinforced resin. That is, the present invention includes:
[1] A method for producing a fiber-reinforced resin molded article having a thickness from 1.0 mm to 9.0 mm by pressing a single prepreg of a fiber-reinforced resin, a plurality of stacked prepregs or a plurality of stacked prepregs with adhesive resin sheets interposed between the prepregs, the method comprising the steps of:
positioning the prepreg between a heated upper die and a heated lower die,
lowering the upper die and applying a load to the prepreg with the upper die and the lower die while further increasing temperatures of the upper die and the lower die to a temperature range from 10° C. lower than a curing starting temperature of a prepreg resin to 20° C. higher than the curing starting temperature of the prepreg resin within 1 minute before or after the upper die is positioned at a bottom dead center, maintaining the temperatures of the upper die and the lower die within the temperature range from 10° C. lower than the curing starting temperature of the prepreg resin to 20° C. higher than the curing starting temperature of the prepreg resin for 0.3 to 2 minutes per 1 mm of a thickness of the prepreg while the upper die is positioned at the bottom dead center, reducing or stopping the heating of the upper die and the lower die, and after reducing or stopping the heating, raising the upper die to extract the fiber-reinforced resin molded article.

[2] The method for producing a fiber-reinforced resin molded article according to [1], wherein the fiber-reinforced resin is a thermosetting carbon fiber-reinforced epoxy resin.

[3] The method for producing a fiber-reinforced resin molded article according to [1] or [2], wherein temperature increasing rates of the upper die and the lower die are 5 to 40° C./min.

Effects of the Invention

In the present invention, the press molding of the fiber-reinforced resin can be performed by properly controlling the temperature and the pressure, as a result, the fiber-reinforced resin molded article having high accuracy shape can be produced.

BRIEF DESCRIPTION OF DRAWING

FIG. 3 is the figure of the explaining cross-sectional drawing of the press molding of the fiber-reinforced resin of the present invention.

Form to Carry Out Invention

The present invention is described below by referencing to the figures of the Example. Note that the invention is not limited to the Example described below. The suitable modifications are possible within the technical range known to a person skilled in the art.

In this specification, the fiber-reinforced resin molded article is a molded article obtained by heating a prepreg for curing. The prepreg is obtained by impregnating a bundle of the fiber such as carbon fiber and glass fiber with a thermoplastic resin or a thermosetting resin and drying.

In the present invention, a thermosetting resin, a thermoplastic resin or a resin composition containing the one thereof can be used as a resin.

Examples of the thermosetting resin constituting the prepreg include an epoxy resin, a vinyl ester resin, an unsaturated polyester resin, a polyurethane resin and a phenol resin. These may be used in combination.

Also, examples of the thermoplastic resin include an acryl resin, a polyester resin, a polycarbonate resin, a polypropylene resin, a polyethylene resin, a polystyrene resin, a vinyl chloride resin and a polyamide resin. These may be used alone or in combination of one or more.

EXAMPLE

[Press Molding of Fiber-Reinforced Resin]

The press molding of the fiber-reinforced resin of the present invention includes press-molding the fiber-reinforced resin prepreg 3 to produce the fiber-reinforced resin molded article.

Figure 1:
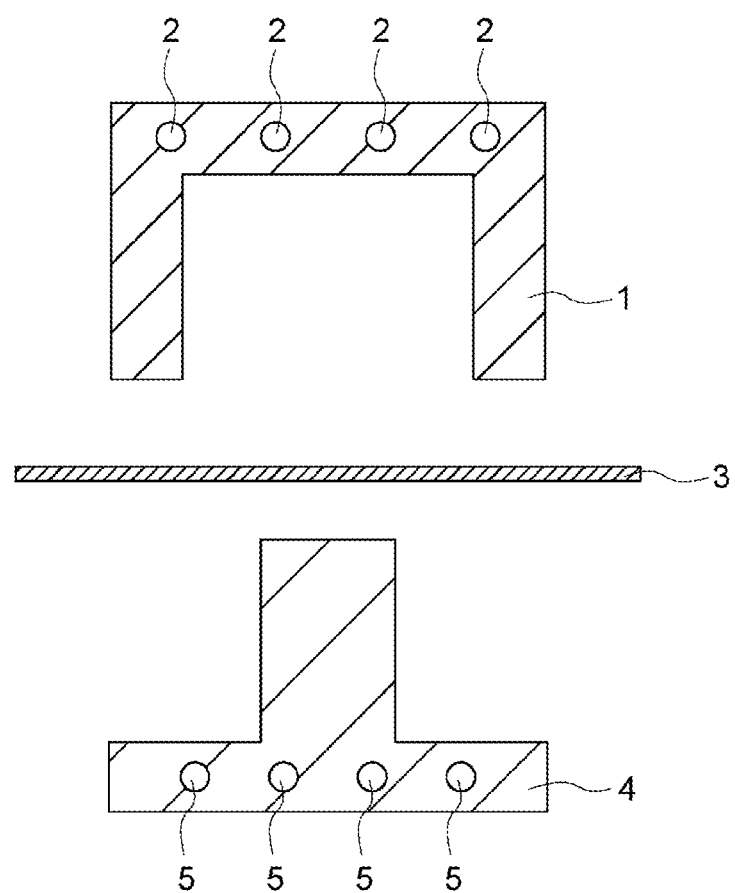
FIG. 1 is the figure of the explaining cross-sectional drawing of the press molding of the fiber-reinforced resin of the present invention.

The device for producing the fiber-reinforced resin molded article by pressing of the present invention includes concave upper die 1 positioned above and convex lower die 4 acting as the opposite side of the upper die 1 as shown in FIG. 1.

The concave shape of the upper die 1 is a female die for molding the prepreg 3 and the convex shape of the lower die 4 is a male die to the upper die 1. The upper die 1 is equipped with heater 2 to heat the upper die 1 and the lower die 4 is equipped with the heater 5 to heat the lower die 4.

Figure 2:
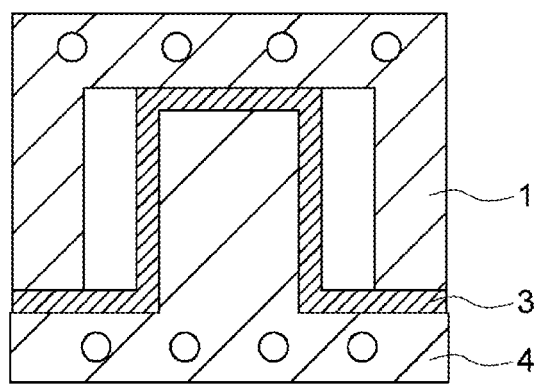
FIG. 2 is the figure of the explaining cross-sectional drawing of the press molding of the fiber-reinforced resin of the present invention.

The press molding method of the present invention includes positioning the prepreg 3 between the heated upper die 1 and the heated lower die 4 (Step a shown in FIG. 1), lowering the upper die 1 and applying the load to the prepreg 3 by the upper die 1 and the lower die 4 while further increasing the temperatures of the upper die 1 and the lower die 4 (Step b shown in FIG. 2), maintaining temperatures of the upper die 1 and the lower die 4 within the prescribed temperature range while the upper die 1 is positioned at the bottom dead center (Step c FIG. 2), reducing or stopping the heating of the upper die 1 and the lower die 4 (Step d shown in FIG. 2), and after reducing or stopping the heating, raising the upper die 1 to extract the fiber-reinforced resin molded article (Step e in FIG. 3) as shown in the producing steps of FIGS. 1 to 3.

Note that in this Example, the fiber-reinforced resin prepreg obtained by impregnating the carbon fiber with the epoxy resin is used as prepreg 3, but the fiber-reinforced resin prepreg is not particularly limited to the prepreg used in this Example.

In this Example, the cloth prepreg manufactured by MITSUBISHI RAYON CO., LTD (3K plain weave, thickness of 0.23 mm) was used as prepregs and a plurality of stacked prepregs were used to obtain the completed fiber-reinforced resin molded article having a thickness of 1.6 mm. Note that the technique disclosed in the specification can be used for producing the fiber-reinforced resin molded article having a thickness from 1.0 mm to 9.0 mm and the thickness of the completed article can be adjusted by changing the number of the stacked prepregs. Furthermore, the adhesive strength between the prepregs can be also improved by interposing an adhesive resin sheet between the prepregs, when the prepregs are stacked. For example, the epoxy adhesive resin sheet can be used as an adhesive resin sheet. The adhesive resin sheet may be interposed between all the stacked prepregs or only between the prepregs requiring adhesive strength.

One of the characteristics of the present invention is that the proper temperature and the proper pressure are set in the press step. At first, before the prepreg 3 was positioned, the upper die 1 and the lower die 4 were heated respectively. The temperature increasing rate of each die by heating was 20° C./min in this Example, but is not limited. For example, the temperature increasing rate of each die by heating is preferably 5 to 40° C./min, more preferably 10 to 30° C./min.

Next the prepreg 3 was positioned on the lower die 4 (Step a). In the case of the carbon fiber-reinforced epoxy resin (the thermosetting resin), the prepreg 3 is preferably positioned on the lower die 4 when the temperature of the upper die 1 and the lower die 4 are about 80° C. respectively, but it depends on the material constituting the prepreg. The position of this situation is position (1) in FIG. 4.

After the prepreg 3 was positioned, the upper die 1 was lowered while further increasing the temperature at 20° C./min. Then, the upper die 1 is contacted with the prepreg 3 (the position (2) in FIG. 4) and the upper die 1 was further lowered to the bottom dead center (Step c). After the upper die 1 is contacted with the prepreg 3, the load becomes larger when the upper die 1 is further lowered.

Within 1 minute, preferably within 30 seconds before or after the upper die 1 reached the bottom dead center, more preferably at the same time of the reach, the temperatures of the upper die 1 and the lower die 4 were set within the temperature range from 10° C. lower than the curing starting temperature of the resin (prepreg 3) to 20° C. higher than the curing starting temperature of the prepreg resin. When the temperature of each die increases to the curing starting temperature at the time of more than 1 minute before the upper die reaches the bottom dead center, the resin hangs down before pressing and it is difficult to obtain the fiber-reinforced resin molded article having a proper shape. When the temperatures become high at the time of more than 1 minute after the upper die reaches the bottom dead center, the upper die 1 is contacted with the prepreg 3 to deform the prepreg 3, before the prepreg 3 has sufficient softness. In some cases, there is a possibility that the prepreg is broken. The curing starting temperature of the prepreg 3 used in this Example is 130° C., so the temperature of the die is set so that the temperature of the die can be maintained at around 130° C.

In this Example, the state that the upper die 1 was at the bottom dead center and the temperatures of the dies were within the temperature range from 10° C. lower than the curing starting temperature of the resin to 20° C. higher than the curing starting temperature of the resin (in this Example 130° C.) was maintained for 2 minutes (prepreg 3 had a thickness of 1.6 mm, so the maintaining time was 1.25 minutes per 1 mm of the thickness of the prepreg), but the maintaining time is not limited. In the present invention, the maintaining time is preferably from 0.3 to 2 minutes per 1 mm of the thickness of the prepreg. In the present invention, the prepreg having a thickness of 1.0 mm to 9.0 mm can be used, so the maintaining time for the prepreg having a thickness of 9.0 mm is from 2.7 to 18 minutes. The maintaining time is more preferably from 0.6 to 1.5 minutes per 1 mm of the thickness of the prepreg. When the maintaining time is short, the desired shape is difficult to obtain. Especially the molding state of the corner is insufficient. When the maintaining time is too long, the pressing time of one time becomes too long, which is inefficient.

Figure 4:
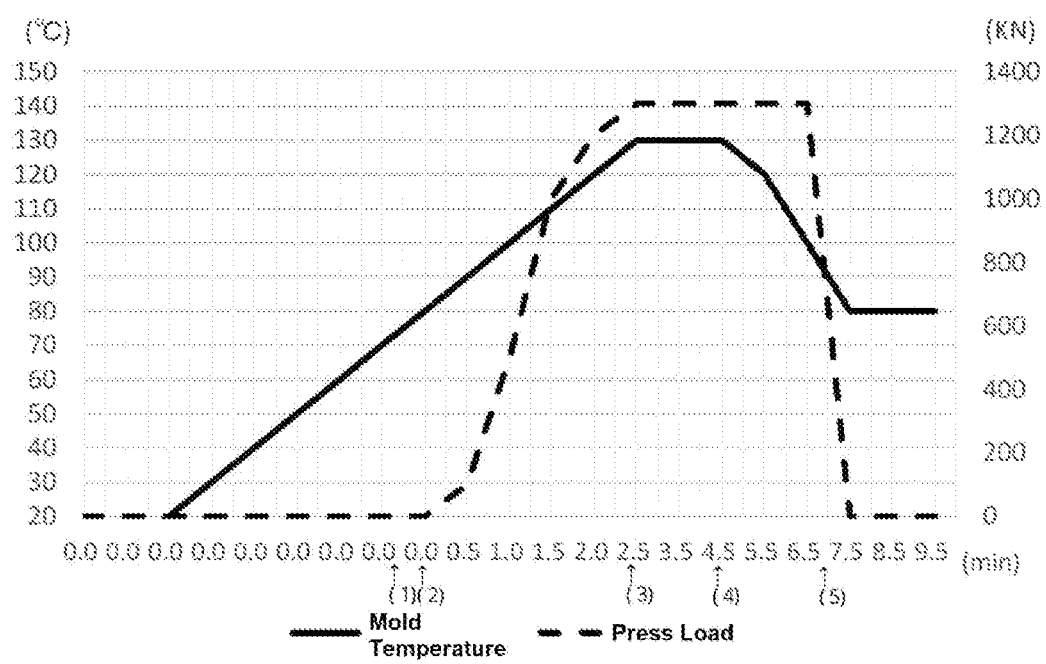
FIG. 4 is the graph showing the changes of the temperature of the dies and the load during pressing in the Example.

After the states that the upper die 1 was at the bottom dead center and the temperatures of the upper die 1 and the lower die 4 were within the temperature range from 10° C. lower than the curing starting temperature of the prepreg resin to 20° C. higher than the curing starting temperature of the prepreg resin were maintained for the prescribed time, the heating of the upper die 1 and the lower die 4 was stopped (position (3) in FIG. 4). After the stop of the heating, the temperature of each die fell gradually. Meanwhile the upper die 1 was maintained at the bottom dead center. By maintaining the upper die 1 at the bottom dead center, the prepreg 3 can be cured. The maintaining time is not limited. But it is preferable that the upper die 1 was maintained until the temperature become preferably more than 20° C. lower than the curing starting temperature of the prepreg 3, more preferably more than 25° C. lower than the curing starting temperature of the prepreg 3, because there is no deformation when it is extracted. When the upper die 1 is at the bottom dead center, the pressure is preferably 1000 KN to 1400 KN.

After the heating was stopped and the upper die 1 was maintained at the bottom dead center further, the pressing by the upper die 1 was stopped (position (4) in FIG. 4). The upper die 1 was raised to the original position (Step e). The molded prepreg (fiber-reinforced resin molded article) was extracted and the press molding was completed.

When the pressing is performed continuously, the temperatures of the dies need not to be returned to the room temperature and may be set to be from 70° C. to 90° C. When the temperature is high in some degrees, the time for heating again can be shorter and the required energy can be reduced.

By using the method for the press working described above, the press working of the fiber-reinforced resin which is difficult to press compared to the metal can be achieved.

DESCRIPTION OF CODE

1 Upper die
2 Heater for upper die
3 Prepreg
4 Lower die
5 Heater for lower die

The invention claimed is:

1. A method for producing a fiber-reinforced resin molded article having a thickness from 1.0 mm to 9.0 mm by pressing a single prepreg of a fiber-reinforced resin, a plurality of stacked prepregs or a plurality of stacked prepregs with adhesive resin sheets interposed between the prepregs, the method comprising the steps of:
    positioning the prepreg between a heated upper die and a heated lower die,
    lowering the upper die and applying a load to the prepreg with the upper die and the lower die, wherein the upper die is lowered while temperatures of the upper die and the lower die are further increased to a temperature range from 10° C. lower than a curing starting temperature of a prepreg resin to 20° C. higher than the curing starting temperature of the prepreg resin within 1 minute before or after the upper die is positioned at a bottom dead center,
    maintaining the temperatures of the upper die and the lower die within the temperature range from 10° C. lower than the curing starting temperature of the prepreg resin to 20° C. higher than the curing starting temperature of the prepreg resin for 0.3 to 2 minutes per 1 mm of a thickness of the prepreg while the upper die is positioned at the bottom dead center,
    reducing or stopping the heating of the upper die and the lower die, and
    after reducing or stopping the heating, raising the upper die to extract the fiber-reinforced resin molded article.

2. The method for producing a fiber-reinforced resin molded article according to claim 1, wherein the fiber-reinforced resin is a thermosetting carbon fiber-reinforced epoxy resin.

3. The method for producing a fiber-reinforced resin molded article according to claim 1, wherein temperature increasing rates of the upper die and the lower die are 5 to 40° C./min.

\* \* \* \* \*